United States Patent
Haglund et al.

(10) Patent No.: US 9,360,321 B2
(45) Date of Patent: Jun. 7, 2016

(54) NAVIGATION BASED ON AT LEAST ONE SENSOR AND A THREE DIMENSIONAL MAP

(71) Applicant: Vricon Systems Aktiebolag, Linkoeping (SE)

(72) Inventors: Leif Haglund, Brokind (SE); Johan Bejeryd, Linkoeping (SE); Per Carlbom, Linkoeping (SE); Zoran Sjanic, Linkoeping (SE)

(73) Assignee: Vricon Systems Aktiebolag, Linkoeping (SE)

( * ) Notice: Subject to any disclaimer, the term of this patent is extended or adjusted under 35 U.S.C. 154(b) by 0 days.

(21) Appl. No.: 14/363,261

(22) PCT Filed: Apr. 14, 2014

(86) PCT No.: PCT/SE2014/050458
§ 371 (c)(1),
(2) Date: Jun. 5, 2014

(87) PCT Pub. No.: WO2015/160288
PCT Pub. Date: Oct. 22, 2015

(65) Prior Publication Data
US 2015/0292888 A1 Oct. 15, 2015

(51) Int. Cl.
*G01C 21/00* (2006.01)
*G05D 1/08* (2006.01)
*G06T 7/00* (2006.01)
*G06T 7/20* (2006.01)
*G01S 19/13* (2010.01)
*G01S 19/49* (2010.01)

(52) U.S. Cl.
CPC ............ *G01C 21/005* (2013.01); *G01S 19/13* (2013.01); *G01S 19/49* (2013.01); *G05D 1/0808* (2013.01); *G06T 7/0026* (2013.01); *G06T 7/0044* (2013.01); *G06T 7/2073* (2013.01); *G05D 1/08* (2013.01); *G06T 2207/10032* (2013.01); *G06T 2207/20016* (2013.01)

(58) Field of Classification Search
CPC ............ G01C 21/005; G06T 7/0044; G06T 2207/10032; G05D 1/08; G05D 1/0808
USPC ............ 701/3, 36, 408, 409, 445, 446, 448, 701/518, 523; 382/154, 181, 209, 216–219, 382/276, 278, 279, 285, 312, 318, 321; 348/113–117, 143, 144
See application file for complete search history.

(56) References Cited

U.S. PATENT DOCUMENTS

| | | | |
|---|---|---|---|
| 7,191,056 B2 * | 3/2007 | Costello | F41G 7/343 348/117 |
| 7,313,252 B2 * | 12/2007 | Matei | G06T 7/0044 348/143 |

(Continued)

FOREIGN PATENT DOCUMENTS

| | | |
|---|---|---|
| AT | 511460 A4 | 12/2012 |
| EP | 1806700 A1 | 7/2007 |

(Continued)

OTHER PUBLICATIONS

European Patent Office, Extended European Search Report for Application No. 15163511.7, Sep. 10, 2015, 9 pages, Germany.

*Primary Examiner* — Russell Frejd
(74) *Attorney, Agent, or Firm* — Alston & Bird LLP

(57) ABSTRACT

The invention relates to a method for navigation of an aerial vehicle. The method comprises providing a sensor image from an aerial vehicle sensor. The method also comprises repeatedly, until at least one predetermined criterion is reached, perform the step of setting input data, where the input data comprises information related to pitch angle, roll angle, yaw angle and three-dimensional position of the aerial vehicle, the step of providing a two-dimensional image from a database based on the input data, where the database comprises three-dimensional geo-referenced information of the environment, and the step of comparing the sensor image and the two dimensional image from the database. The method further comprises using the input data for which the two images correspond best to each other for determining at least one of the following quantities pitch angle, roll angle, yaw angle and three-dimensional position of the aerial vehicle. The invention also relates to a system, a computer program and a computer program product.

21 Claims, 5 Drawing Sheets

(56) References Cited

U.S. PATENT DOCUMENTS

| | | | |
|---|---|---|---|
| 9,121,669 B1* | 9/2015 | Hyslop | F41G 7/2206 |
| 2011/0282580 A1 | 11/2011 | Mohan | |
| 2014/0155098 A1* | 6/2014 | Markham | H04B 1/0064 455/456.3 |

FOREIGN PATENT DOCUMENTS

| EP | 1860456 A1 | 11/2007 |
|---|---|---|
| EP | 2144038 A2 | 1/2010 |

* cited by examiner

NAVIGATION BASED ON AT LEAST ONE SENSOR AND A THREE DIMENSIONAL MAP

CROSS REFERENCE TO RELATED APPLICATIONS

This application is a National Stage Application, filed under 35 U.S.C. §371, of International Application No. PCT/SE2014/050458, filed Apr. 14, 2014, the contents of which are hereby incorporated by reference in their entirety.

BACKGROUND

1. Related Field

The present invention relates to a method and a system for navigation of an aerial vehicle. It also relates to a computer program and a computer program product for navigation of an aerial vehicle.

2. Description of Related Art

Navigation of vehicles, especially aerial vehicles, is today often based on a global navigation satellite system (GNSS), like GPS. This has the advantage that the position of the own vehicle is quite well known within some uncertainty. It can, however, happen that a vehicle has to travel through an area where a GNSS-signal is denied, for example during war or conflicts, or since some entity for whatever reason uses interfering transmitters to disturb GNSS-signals. Also technical failures might in principle cause GNSS-signal interruption.

To be able to navigate without GNSS some vehicles have inertial measurements units (IMU) on board. They can be used to keep track of the vehicle's current position using a process called dead reckoning. These IMU-systems have, however, the tendency that the calculated position will differ from the real position more and more with time. This is due to the fact that errors entering the calculations add up. Therefore, the longer the time a vehicle navigates with an IMU only, the bigger the uncertainty about the actual real position of that vehicle.

To lower the uncertainty of the actual real position and to lower the difference between a calculated actual position and the real actual position one can use an IMU with better components. This does, however, only lower the errors and the differences, whereas the total error and the total uncertainty still increase as time goes by. On the other hand, an IMU with better components usually increases the weight of the IMU substantially. Especially for airborne vehicles, this can result in the constraint that less fuel can be transported by the airborne vehicle and that, depending on the size of the airborne vehicle, therefore the range can be lowered drastically. It exists therefore a need for a navigation method in GNSS denied areas wherein the position errors do not add up with time.

EP 2 144 038 A2 discloses an inertial measurement using an imaging sensor and a digitized map. The system determines a vehicle's attitude and position based on extracting at least three features out of image data. Depending on the environment the extraction of at least three features can be different or even impossible to perform. Still GPS or similar systems are needed for determining an absolute position.

BRIEF SUMMARY

One object of the present disclosure is to provide navigation methods, systems, and aerial vehicles which seek to mitigate, alleviate or eliminate one or more of the above identified deficiencies in the art and disadvantages singly or in any combination.

This is achieved by a method for navigation of an aerial vehicle. The method comprises providing a sensor image from an aerial vehicle sensor. The method also comprises to repeatedly, until at least one predetermined criterion is reached, perform the step of setting input data, where the input data comprises information related to pitch angle, roll angle, yaw angle and three-dimensional position of the aerial vehicle, the step of providing a two-dimensional image from a database based on the input data, where the database comprises three-dimensional geo-referenced information of the environment, and the step of comparing the sensor image and the two dimensional image from the database. The method further comprises using the input data for which the two images correspond best to each other for determining at least one of the following quantities pitch angle, roll angle, yaw angle and three-dimensional position of the aerial vehicle.

An advantage of such a method is that it not relies on a GNSS. Thus, this navigation method is especially suitable in GNSS-denied areas. It further does not rely on feature extraction, thus being especially usable in areas where feature extraction would be difficult or impossible to perform. The method has also the advantage of performing better than navigation based on an IMU only since the step of comparing images is based on an absolute comparison, due to the fact that the information in the database is geo-referenced, and not on a relative comparison to previously determined values as for IMU-only navigation methods.

In one example the determined at least one quantity comprises the three-dimensional position of the aerial vehicle.

This is often the most interesting quantity for navigation purposes. Thus, this example will be especially favourable for most navigation tasks. It has further the advantage that an error or an uncertainty about the real position of the vehicle does not increase over time.

In one example the step of comparing the sensor image and the two dimensional image from the database comprises calculating a similarity measure between the two images.

In one example, the two images which correspond best to each other are the two images which have the highest calculated similarity measure between the two images.

A similarity measure is usually a good indication of how well the images correspond to each other, thus calculating a similarity measure allows giving an indication about how well the information related to the angles and the three-dimensional position of the aerial vehicle, which is comprised in the input data, corresponds to the real angles and three-dimensional position of the aerial vehicle.

In one example calculating a similarity measure between the two images comprises calculating a cross-correlation between the two images, preferably a normalised cross-correlation.

Calculating a cross-correlation is especially suitable for determining how close the images are to each other. A normalised cross-correlation (NCC) provides a very usable and simple measure of correspondence, since a NCC of 1 corresponds to perfect correspondence, a NCC of 0 corresponds to no correspondence at all, and the higher the NCC between 0 and 1 the better the correspondence between the images.

In one example the step of providing a two-dimensional image from a database based on the input data comprises providing the two-dimensional image from the database in such a way that it is projected onto the field of view of the aerial vehicle sensor, where it is assumed that the aerial vehicle has its pitch angle, roll angle, yaw angle and three-dimensional position according to the input data.

This is a preferred example of the method. The three-dimensional geo-referenced information of the environment comprised in the database can usually be used to be converted to a 3D-map or a 3D model. The two-dimensional image from the database will then be provided as if a camera at the place of the sensor and with the same orientation as the sensor would have taken an image of the 3D-model or the 3D-map. Thus the sensor image and the image from the database should have the same transformations and/or deformation of objects on the ground and of the ground itself in the images. Having the same transformations and/or deformations on images is a big advantage when comparing images, since errors due to the transformation/deformation don't need to be considered, or at least need to be considered much less.

In one example the setting of the input data is updated in each step in such a way as to find the best correspondence between the two images.

Target-oriented updating the input data highly reduces calculation time, or, if calculation time is fixed, gives a higher chance to find a better correspondence between the images and thus better values for the at least one quantity.

In one example the value of the normalised cross-correlation for the two images which correspond best to each other is used for calculating an uncertainty of the least one quantity.

This provides a simple method for determining an uncertainty of the determined at least one quantity.

In one example the predetermined criterion is that the steps are repeated a predetermined number of times and/or that the best correspondence between the two images which has been achieved so far converges.

These are favourable criteria, since the first one assures a maximum time for a calculation and the latter one that the calculation can be finished if no further significant improvements in the similarity measure can be achieved.

In one example an uncertainty in the three-dimensional geo-referenced information of the environment is used to calculate an uncertainty of the at least one quantity.

This allows for getting a measure for the reliability of the value of the at least one quantity, which might be helpful when calculating risks of specific decisions based on the determined at least one quantity. For example, when the uncertainty of the determined at least one quantity is so big that it cannot be assured that the aerial vehicle will not crash when taking a certain navigation route, it might be advisable to take another less risky route.

In one example sensor images from different aerial vehicle sensors are provided and the method is performed independently for the sensor image of each such aerial vehicle sensor, whereupon the determined at least one quantity is a combination of the determined at least one quantity for each independently performed method.

This allows for better determining the at least one quantity or for determining more of the at least one quantity since more sensor images are used. It also allows to use the method in more situations since one sensor image alone might not give reliable results under all conditions, for example, day/nighttime, clouded/non-clouded sky, and so on.

In one example the combination of the determined at least one quantity for each independently performed method is based on the reliability and/or accuracy of the sensors from which the sensor images are provided.

This assures that information originating from more reliable and/or more accurate sensors contributed more to the determined at least one quality than information originating from less reliable and/or less accurate sensors, thus increasing the reliability and/or accuracy of the determined at least one quality.

In one example an initial setting of the input data comprises information related to assumed real values for the aerial vehicle, especially information related to assumed real values for the pitch angle, the roll angle, the yaw angle and the three-dimensional position of the aerial vehicle.

Doing this is usually a good starting point for determining the at least one quantity, since it is the best guess one can make before performing the method. Thus, having assumed real values as a starting point can both reduce calculation time and it allows to say when a better value/better values than the assumed value(s) for the determined at least one quantity have been found.

In one example, the input data comprises pitch angle, roll angle, yaw angle and three-dimensional position of the aerial vehicle, and the determined at least one quantity is the corresponding at least one quantity of the input data for which the two images correspond best to each other.

The objective is also achieved by a system for navigation of an aerial vehicle. The system comprises a database, which contains three-dimensional geo-referenced information of the environment. The system also comprises at least one aerial vehicle sensor providing a sensor image. The system further comprises a processing unit, which is arranged to receive the sensor image. The processing unit is also arranged to set input data comprising information related to pitch angle, roll angle, yaw angle and a three-dimensional position of the aerial vehicle. It is further arranged to provide two-dimensional images from the database based on the input data. It is even further arranged to compare the sensor image with two-dimensional images from the database and to decide which of the two-dimensional images corresponds best to the sensor image. It is yet even further arranged to determine at least one of the following quantities pitch angle, roll angle, yaw angle and three-dimensional position of the aerial vehicle based on the input data for which the best correspondence was achieved between one of the two-dimensional images and the sensor image. The processing unit is also arranged to communicate said at least one quantity.

The system has the advantage that it does not rely on a GNSS. Thus, this system for navigation is especially suitable in GNSS-denied areas. It further does not rely on feature extraction, thus being especially usable in areas where feature extraction would be difficult or impossible to perform. The system further has the advantage that it can use equipment, like sensors and/or a processing unit, which might already be provided on board the aerial vehicle. The system has also the advantage of performing better than navigation based on an IMU only since the step of comparing images is based on an absolute comparison, due to the fact that the information in the database is geo-referenced, and not on a relative comparison to previously determined values as for IMU-only navigation methods.

In one embodiment the system further comprises a steering unit for the aerial vehicle, the steering unit being arranged to receive the communicated said at least one quantity.

This is especially suitable for navigation, since it allows the system being integrated with the control of the aerial vehicle. The control can be man-based, like from a pilot or an operator, and/or machine-based, like an autopilot.

In one embodiment the determined at least one quantity comprises the three-dimensional position of the aerial vehicle.

One advantage is that an error or an uncertainty about the real position of the vehicle then does not increase over time.

In one embodiment the processing unit is arranged to repeatedly perform the processes of setting input data, providing a two-dimensional image, and comparing the two-dimensional image with the sensor image until at least one predetermined criterion is reached.

This is especially suitable for an optimisation procedure of the determined at least one quantity.

In one embodiment the system comprises several aerial vehicle sensors. Each sensor provides a sensor image. The processing unit is further arranged to perform independently for each sensor image said processes of receiving sensor images, setting input data, providing two-dimensional images, comparing images, and determining at least one of the following quantities pitch angle, roll angle, yaw angle and three-dimensional position of the aerial vehicle. The processing unit is further arranged to determine a combined at least one quantity based on the corresponding determined at least one quantity for each sensor image.

This allows for better determining the at least one quantity or for determining more of the at least one quantity since more sensor images are used. It also allows use of the system in more situations since one sensor image alone might not give reliable results under all conditions, for example, day/nighttime, clouded/non-clouded sky, and so on.

In one embodiment the processing unit is further arranged to calculate an uncertainty for the determined at least one quantity based on an uncertainty in the three-dimensional geo-referenced information of the environment.

This allows for getting a measure for the reliability of the value of the at least one quantity, which might be helpful when calculating risks of specific decisions based on the determined at least one quantity. For example, when the uncertainty of the determined at least one quantity is so big that it cannot be assured that the aerial vehicle will not crash when taking a certain navigation route, it might be advisable to take another less risky route.

The object is also achieved by a computer program. The computer program comprises a program code for navigation of an aerial vehicle. The computer program also comprises the step of providing a sensor image from an aerial vehicle sensor. It further comprises repeatedly, until at least one predetermined criterion is reached, performing the step of setting input data comprising information related to pitch angle, roll angle, yaw angle and three-dimensional position of the aerial vehicle, the step of providing a two-dimensional image from a database based on the input data, where the database comprises three-dimensional geo-referenced information of the environment, and the step of comparing the sensor image and the two dimensional image from the database. It also comprises using the input data for which the two images correspond best to each other for determining at least one of the following quantities pitch angle, roll angle, yaw angle and three-dimensional position of the aerial vehicle.

The object is also achieved by a computer program product which comprises a program code stored on a computer readable media for navigation of an aerial vehicle. The computer program product also comprises the step of providing a sensor image from an aerial vehicle sensor. It further comprises repeatedly, until at least one predetermined criterion is reached, performing the step of setting input data comprising information related to pitch angle, roll angle, yaw angle and three-dimensional position of the aerial vehicle, the step of providing a two-dimensional image from a database based on the input data, where the database comprises three-dimensional geo-referenced information of the environment, and the step of comparing the sensor image and the two dimensional image from the database. It also comprises using the input data for which the two images correspond best to each other for determining at least one of the following quantities pitch angle, roll angle, yaw angle and three-dimensional position of the aerial vehicle.

Further advantages of the present invention are, among others, that an IMU can be omitted in one example and/or one embodiment and that the size and/or weight of the system can be made smaller than the omitted IMU, thus saving space and/or weight of the aerial vehicle and increasing its range.

Yet a further advantage of the present invention is, among others, that in one embodiment a simpler IMU can be used, which preferably is smaller and has less weight than previously used IMUs. This is due to not being reliable on the accuracy of the IMU for navigating the aerial vehicle in a GNSS-denied area. The used system can then be made smaller and/or less weighted than the saved space and/or weight through the simpler IMU, thus increasing the range of the vehicle.

DETAILED DESCRIPTION OF VARIOUS EMBODIMENTS

Figure 1A:
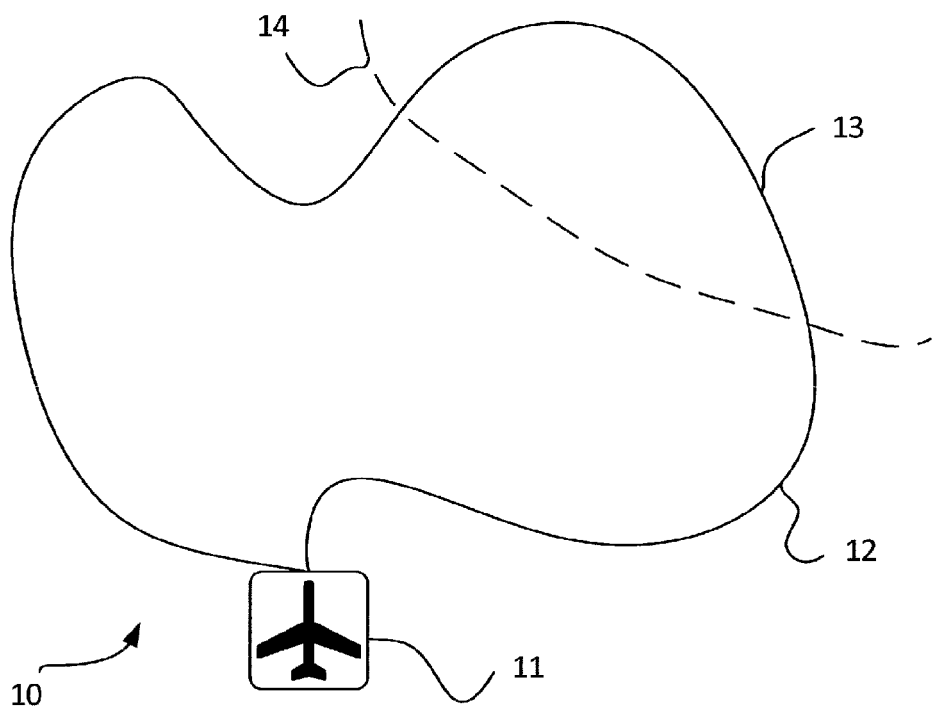
FIG. 1a depicts schematically a situation where the present invention can be used.

FIG. 1a depicts schematically a situation 10 where the present disclosure can be used. An aerial vehicle will start at some starting point 11. The aerial vehicle can be any kind of aerial vehicle. In one example the aerial vehicle is an airplane or a helicopter. The aerial vehicle can be manned or unmanned. In one example the aerial vehicle is an unmanned aerial vehicle, UAV. The aerial vehicle can also be an aerial vehicle, which is not supposed to return to the starting point 11, like a missile or a rocket. The aerial vehicle can in principle be any kind of aerial vehicle, both a civilian and a military aerial vehicle. In one example the aerial vehicle has an IMU. In one example the aerial vehicle has means for receiving data provided from a GNSS and means for calculating the own position based on the GNSS-data. The starting point 11 can be any kind of starting point. In one example, the starting point is an aerodrome like an airport, an airfield, or a rocket launch site. It can also be a carrier. In one example the starting point is a missile launching unit. This can be situated on a naval unit, on a land-based unit or on an aerial unit. The aerial vehicle will after start from the starting point 11 fly along a flight path 12. In the example of FIG. 1a the flight path 12 returns to the starting point 11. In another example the flight path will go to a separate landing point. In yet another example the flight path will end at some point, for example a military target. This can be a land-based target, a water-based target or an air-based target. The flight path 12 can be predetermined or not. In one example the flight path 12 will be changed during flight of the aerial vehicle. In general, the position and the attitude of the aerial vehicle at the starting point 11 is known. This can be due to sensors on the aerial vehicle. This can also be due to surveying of the starting point.

It can also be due to sensors and/or some other pre-knowledge on the starting point, especially in case the starting point is moving. In one example the position and attitude of the starting point is known based on sensors of a carrier or another aerial vehicle. It can also be based on a GNSS, like GPS.

The aerial vehicle usually has a navigation system which is arranged to determine an absolute position of the vehicle. This is, however, not a prerequisite of the present invention. In case the aerial vehicle has a system to determine the absolute position, this system is based on a GNSS. Thus, the system might be vulnerable to technical failures of the GNSS, to service denial of the GNSS or to jamming. In the example of FIG. 1a the dotted line 14 indicates the border between an area where the GNSS reliably works (the area which is below and left of line 14) and an area where the GNSS does not reliably work (the area which is above and right of the line 14). In the example of FIG. 1a the aerial vehicle thus has to find another way to determine its position on the flight path 13.

In the following, when referring to a GNSS-denied area here and in the whole document, this can be due to any reason. It should not only comprise the case of actively denying GNSS, but also the case of GNSS denial due to technical reasons or due to any possible disturbance. The GNSS-denied area can in one example also comprise the starting point 11. In one example, the whole flight path is comprised in the GNSS-denied area. In another example different parts of flight path are comprised in the GNSS-denied area. The GNSS-denied area can also change during flight of the aerial vehicle.

The aerial vehicle will have some initial values for attitude and position before entering the GNSS-denied area. This can be due to the navigation system which includes a GNSS and which works before entering the GNSS-denied area, and/or it can be due to the knowledge of position and attitude from the starting 11 as described above.

The present disclosure can also be used in areas which are not GNSS-denied. In this case the disclosure can be used to check the validity of GNSS-data and/or the drift of an IMU. The invention can then also be used for increasing the position and/or attitude accuracy compared to only relying on GNSS and/or IMU.

Figure 1B:
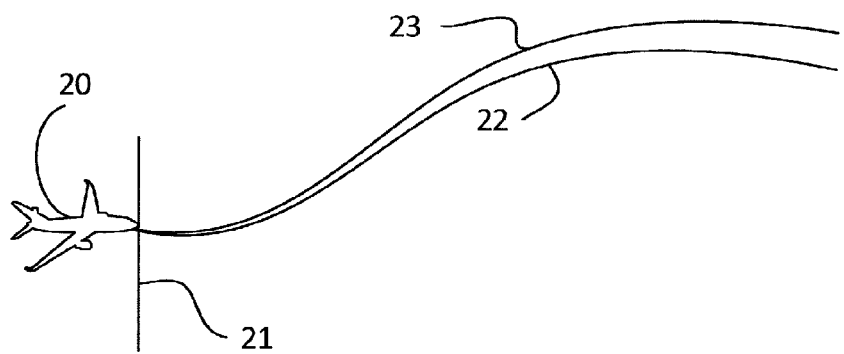
FIG. 1b depicts schematically what happens in a GNSS-denied area in a prior art situation.

FIG. 1b depicts schematically what happens with an aerial vehicle 20 in a GNSS-denied area in a prior art situation. The situation of FIG. 1b is not related to a real scale between the objects. An aerial vehicle 20 might enter the GNSS-denied area at 21. Before entering, its position could be determined with the help of a GNSS like GPS. After entering the GNSS-denied area the aerial vehicle 20 will travel along path 22. For determining its position, the aerial vehicle 20 will have to rely on an IMU since its GPS-receiver will not any longer be able to receive the signals needed to determine its position. The positions determined via the IMU and thus the travel path 23 determined via the IMU will, however, differ from the real travel path 22. The difference will be bigger the more the time advances, as indicated in the figure and as described in the background section.

Figure 2:
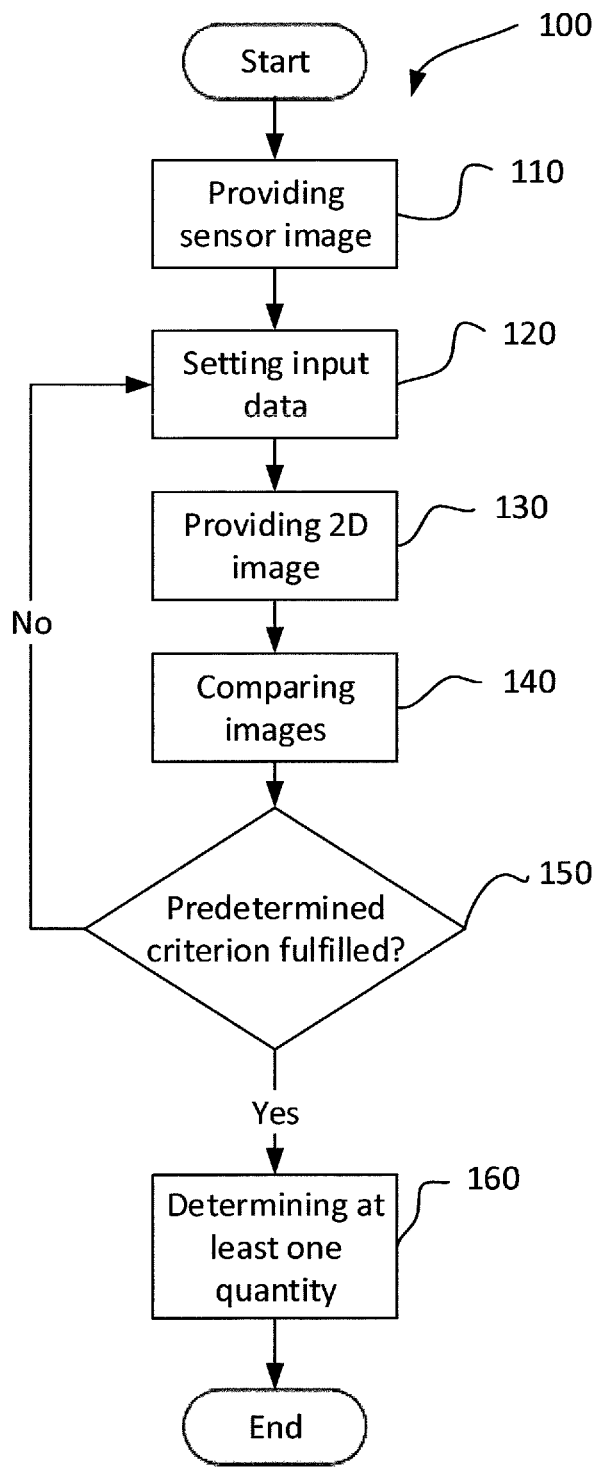
FIG. 2 shows a flow diagram of a method for navigation of an aerial vehicle according to the present invention.

FIG. 2 shows a flow diagram of a method 100 for navigation of an aerial vehicle according to the present disclosure. The method starts with the step 110 of providing a sensor image from an aerial vehicle sensor. Here and in the whole document, when referring to a sensor image, it is always assumed that the sensor image is from an aerial vehicle sensor unless explicitly stated otherwise. The aerial vehicle sensor can be any kind of sensor which allows providing images from the environment, i.e. from the ground over which the aerial vehicle is flying. In one example the aerial vehicle sensor is a camera. In one example the aerial vehicle sensor is a camera based on charge-coupled device (CCD) technology.

In one example the aerial sensor is a camera based on complementary metal-oxide-semiconductor (CMOS) technology. The aerial vehicle sensor can also comprise laser or radar elements. In one example the aerial vehicle sensor is operating with at visible light wavelengths. In one example the aerial vehicle sensor is operating at infra-red (IR) and/or at ultraviolet (UV) wavelength(s). There are many different kinds of aerial vehicle sensors which can provide sensor images and a person skilled in the art will appreciate that different types of sensors have different advantages and disadvantages and can be chosen according to the intended use of the invention. For example, the choice of sensor can be based on whether the sensor should be able to provide sensor images even during night or not, whether it should be able to provide images during cloudy conditions, how much it should cost, and so on. If one sensor is not able to fulfil all requirements different sensors are combined for providing a sensor images. In one example different sensors can be used to provide different sensor images. This will be further described in relation to FIG. 3. It is well known in the art how to convert sensor output into sensor images. Thus, this will not be described here any further. In one example the sensor image is represented as data bits and/or in other electronic representations for further processing. The method continues with step 120. Step 110 does not necessarily need to be performed as the first step. In another example, step 110 is performed at any moment of time before step 140 is performed. This other example is also part of the present invention and covered by the wording of the independent claims.

In step 120 input data is set which comprises information related to pitch angle, roll angle, yaw angle and a three-dimensional position of the aerial vehicle. In one example, initial input data used in a first iteration of the method comprises information related to assumed real values for the aerial vehicle, especially information related to assumed real values for the pitch angle, the roll angle, the yaw angle and the three-dimensional position of the aerial vehicle. Information relating to assumed real values for the pitch angle, the roll angle and the yaw angle are in one example provided by an IMU. In case the aerial vehicle is not in a GNSS-denied area, information to an assumed real value for the three-dimensional position of the aerial vehicle is provided from a GNSS. In one example, the information related to assumed real values for the aerial vehicle is calculated based on the last known position and relative position data. In one example the relative position data is based on data from an IMU, on the speed of the aerial vehicle and the time since the last known position. The last known position is one example the last known position before entering a GNSS-denied area. In one example the last known position is based on the known position of the starting point. In one example the last known position is based on the outcome of a method according to the present disclosure which has been performed at an earlier time. It is known in the art how to calculate assumed real values for a three-dimensional position of an aerial vehicle based on the last known position and relative position data. Therefore, this is not described here any further. The method continues with step 130.

In step 130 a two-dimensional image from a database is provided based on the input data. The database comprises three-dimensional geo-referenced information of the environment. In one example the three-dimensional geo-referenced information of the environment is a 3D map of the environment. In one example the three-dimensional geo-referenced information of the environment is a 3D model of the environment. The 3D model could be any kind of 3D model known to those skilled in the art. In one example, the 3D model is represented as a mesh. In another example the 3D model is represented as a surface representation. In another example the 3D model is represented as a voxel representation. In one example the 3D model includes texture information. In one example the 3D model is a point cloud. In one example the three-dimensional geo-referenced information of the environment is represented in such a way that a 3D model or a 3D map of the environment could be constructed based on the information. In one example the 3D map is a triangular irregular network (tin)-based mesh draped with textures. In one example, a positional or mesh uncertainty is associated to at least some of the nodes/surfaces/edges of the mesh. The mesh uncertainty associated to each respective node/surface/edge represents the uncertainty at that specific point of the model.

It is assumed that the relation between the aerial vehicle and the aerial vehicle sensor from which the sensor image is provided is known. In one example the aerial vehicle sensor is fixedly mounted on the aerial vehicle without any degree of freedom to change its orientation or its position relative to the aerial vehicle. In another example the aerial vehicle sensor has one or more degree of freedoms to change its position and/or orientation relative to the aerial vehicle. This change is then tracked so that the relation between the aerial vehicle and the aerial vehicle sensor from which the sensor image is provided is known. Thus, since the input data comprises information related to pitch angle, roll angle, yaw angle and three-dimensional position of the aerial vehicle, this information also relates to the orientation (i.e. attitude) and position of the aerial vehicle sensor.

The two-dimensional image from the database is then preferably provided in such a way that it corresponds to the sensor image. This is described in further detail in relation to FIG. 4. The method continues with step 140.

In step 140 the sensor image and the two dimensional image from the database are compared. In one example the comparison comprises calculating a similarity measure between the two images. In one example calculating a similarity measure between the two images comprises calculating mutual information. In one example calculating a similarity measure between the two images comprises calculating a chamfer matching. In one example calculating a similarity measure between the two images comprises calculating a phase correlation. In one example calculating a similarity measure between the two images comprises calculating a mathematical correlation, preferably a cross-correlation between the two images, preferably a normalised cross-correlation. A skilled person will realise that there are more similarity measures known in the art which can be calculated here. The aim of this step is to get an indication about how well the two images match each other. In one example a values is calculated representing the degree of matching. In one example calculating the value comprises using one or more convolution calculations. In one example the value is a scalar. In another example the value is a higher-dimensional object. In one example the value is the normalised cross-correlation. The normalised cross-correlation can then take a value between zero and one, where zero corresponds to no match at all between the two images and one stands for full correspondence between the two images. In one example a similarity measure is filtered. If the sensor image fully corresponds to the two-dimensional image from the database one can assume that the pitch angle, roll angle, yaw angle and three-dimensional position of the aerial vehicle to which the information in the input data relates are the true values for the pitch angle, roll angle, yaw angle and three-dimensional position of the aerial vehicle. If they do not fully correspond, one can, for example, take the value of the normalised cross-correlation as a measure of how well the two images correspond to each other. The higher the value is, the better the correspondence. The method continues with step 150.

In step 150 it is checked whether a predetermined condition (i.e. criterion) is fulfilled. This predetermined condition is in one example whether the method has been performed a predetermined number of times or not. In one example the predetermined condition is whether the comparison arrived in step 140 reached or surpassed a certain amount of correspondence between the two images. This is, for example, that the normalised cross-correlation reached or surpassed a specific value. In one example the predetermined condition is that the best correspondence between the two images which has been achieved so far converges. Also other predetermined conditions are possible, isolated or in combination. Several predetermined conditions can be combined so that one or all of them have to be fulfilled.

If the predetermined condition is fulfilled, the method continues with step 160.

If the predetermined condition is not fulfilled, the method continues with step 120, where new input data is set. The new input data is in one example based on the previous input data and on the comparison between the two images. In one example the input data is changed in such a way that it is likely that a better comparison, for example, a better correspondence, will be achieved the next time step 140 is performed. This can in one example be achieved by looking at the gradient of the similarity measure and to set the new input data in the direction of the highest gradient. A convergence of the best correspondence, as named above, is then in one example achieved if the magnitude of the gradient is below a predetermined value. The way of setting new input data can also comprise other methods known in the art for finding a best correspondence, for example methods for detecting whether a global or a local maximum has been achieved for the similarity measure between the two images, for example for the normalised cross-correlation.

In step 160 at least one of the following quantities pitch angle, roll angle, yaw angle and three-dimensional position of the aerial vehicle is determined. In a preferred example the at least one quantity comprises the three-dimensional position of the aerial vehicle. For determining the at least one quantity the input data for which the two images correspond best to each other is used. In one example the input data comprises pitch angle, roll angle, yaw angle and three-dimensional position of the aerial vehicle and the determined at least one quantity is then the corresponding at least one quantity from the input data for which the two images correspond best to each other. In one example the input data comprises information related to pitch angle, roll angle, yaw angle and three-dimensional position of the aerial vehicle and the at least one quantity is then determined using information relating to the corresponding at least one quantity from the input data. This information is then in one example used to calculate the corresponding at least quantity.

The input data for which the two images correspond best to each other is considered being the input data among all used input data which best corresponds to the real values for pitch angle, roll angle, yaw angle and three-dimensional position of the aerial vehicle. Thus, using this input data for determining the at least one quantity will likely give the best possible estimate of the real pitch angle, roll angle, yaw angle and three-dimensional position of the aerial vehicle. However, not all of these quantities have to be determined. For navigation purposes it is in one example enough to only determine the three-dimensional position of the aerial vehicle and taking values for the other quantities from other sources, for example an IMU. In another example, more or all of the quantities are determined from the method of this disclosure. In a different example, when not operating in a GNSS-denied area and the aerial vehicle is equipped with, for example, a GPS-receiver, one can use the method to determine the pitch angle, roll angle, and/or yaw angle of the aerial vehicle. It is obvious that even other combinations of the at least one quantities can be determined. This might depend on the specific circumstance and can be adapted to the specific needs in every circumstance.

In one example, an uncertainty for the at least one determined quantity is calculated. In one example, when a normalised cross-correlation is calculated, the uncertainty of the at least one quantity is based on the value of the normalised cross-correlation. For example, a normalised cross-correlation of 1 corresponds to a perfect correspondence between the two images. Then the uncertainty in the at least one quantity is basically zero. The more the normalised cross-correlation is below 1, the higher is the discrepancy between the two images and thus the higher the uncertainty in the determined at least one quantity. If the three-dimensional geo-referenced information comprises uncertainty values this can be used as well for calculating an uncertainty of the determined at least one quantity. In one example the uncertainty of the determined at least one quantity is based on the uncertainty in the three-dimensional geo-referenced information.

The method ends after step 160.

In one example of method 100 sensor fusion algorithms are used. In one example information relating to the similarity measure is used in a sensor fusion algorithm together with data from the IMU and/or measurement data from other possible sensors at the aerial vehicle. In one example a Kalman filter is used for sensor fusion algorithms. In one example time filtering is used. In one example the time filtering is performed based on a Kalman filter. In one example the time filtering is performed based on a particle filter. In one example the time filtering is performed based on another time filter known in the art. By using any of the aforementioned filters and/or algorithms one can exploit the hitherto described uncertainties and/or possible other measurement uncertainties for increasing the accuracy and/or reducing the uncertainty of the determined at least one quantity. In one example the choice of new input data is based on an output of at least one of the aforementioned filters and/or algorithms.

In case no good assumptions are present for an initial setting of the input data, the method 100 can also be performed, in parallel or sequentially, with different input data settings to get a first idea of which input data might come close to real values of the pitch angle, roll angle, yaw angle and three-dimensional position of the aerial vehicle.

In a preferred example the method 100 is performed on and on again for periodically determining the at least one quantity as the aerial vehicle proceeds its travel.

Figure 3:
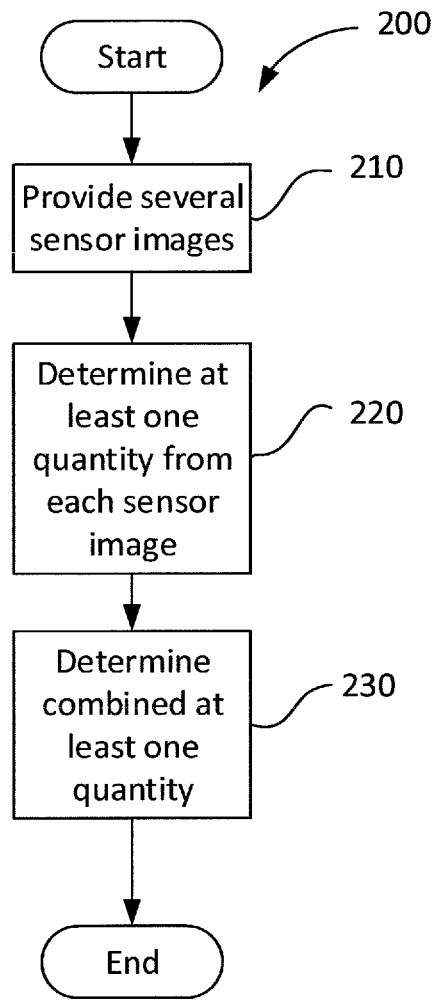
FIG. 3 shows a flow diagram of an extended method for navigation of an aerial vehicle according to the present invention.

In FIG. 3 a flow diagram of an extended method 200 for navigation of an aerial vehicle according to the present invention is shown. The method starts with step 210.

In step 210 several sensor images are provided. The sensor images are provided from different aerial vehicle sensors and they are provided at basically the same time. At a preferred example the maximum difference between the moments of time when any of the sensor images are taken is so low that the aerial vehicle travels, during that time, a distance which is less than the resolution accuracy of the sensors and/or less than the accuracy and/or uncertainty of the geo-referenced information of the environment. The sensor images do not necessarily need to be of the same part of the environment. The aerial vehicle sensors providing the sensor images can have different field of views, different orientations, work at different wavelengths, and so on. Every provided sensor image is provided as described for a single sensor image in step 110 of FIG. 2. An advantage of using several aerial vehicle sensors is that different sensors might cover different wavelengths. A sensor which is good under day-light condition might not be good during night and vice versa. Also, different wavelengths might be interesting at the same time, but there might be no common sensors for all these wavelengths, or a common sensor would be too heavy, too big, too expansive, or for any other reason less suited than different sensors for different wavelengths. All of this might motivate using several sensors. Yet another reason might be that different sensors are already installed at the aerial vehicle for other purposes and thus might be anyhow available for the present invention. After providing several sensor images the method continues with step 220.

In step 220 the method as described in step 120 until step 160 of FIG. 2 is performed independently for each sensor image. Thus, the method can be performed for each sensor image in parallel, in sequence, or any combination thereof. It should also be noted, that the step 210 of providing sensor image can be performed at any time before step 140 is performed for the first time. In one example, step 210 is performed before step 120. In one example step 210 is performed before step 140. This corresponds to the description of step 110. The method continues with step 230.

In step 230 at least one quantities is determined via combining the at least one quantities from step 230. In one example, different at least one quantities have been determined in step 220. For example, a three-dimensional position of the aerial vehicle is determined from one sensor image and at least one from pitch angle, roll angle and yaw angle is determined from another sensor image. The different quantities from the different sensor images are then combined to a total at least one quantity comprising them.

In another example, the same at least one quantity is determined from different sensor images. In this case the values of the at least one quantity are combined to end up at a combined at least one quantity of the aerial vehicle. In one example, the combining process comprises taking the mean value of the values of the at least one quantity from the different sensor images. However, any other method of combining values or quantities which is known in the art may be utilised as well. In one example, the combination of the determined at least one quantity for each independently performed method is based on the reliability and/or accuracy of the sensors from which the sensor images are provided. One sensor might, for example, have a higher accuracy for the sensor image than another sensor. The sensor image with the higher accuracy might then contribute more for determining the combined at least one value than the sensor image with less accuracy. One sensor might, for example, not work reliably during certain daytimes or during certain other conditions (for example, temperature, pressure, etc.). Then it might be advantageous to give sensor images from sensors with higher reliability more weight for determining the combined at least one quantity compared to less reliable sensors. In the most extreme cases one sensor image could have zero weight. This is, for example, if the sensor providing that sensor image has no reliability at all under given circumstances.

It is also possible to combine the above described techniques, i.e. combining the cases that different at least one qualities are determined from different sensor images and that different values for the same at least one quality are taken from different sensor images.

The method ends after step 230.

What is described in relation to fusion algorithms with method 100 applies to method 200 as well.

Figure 4:
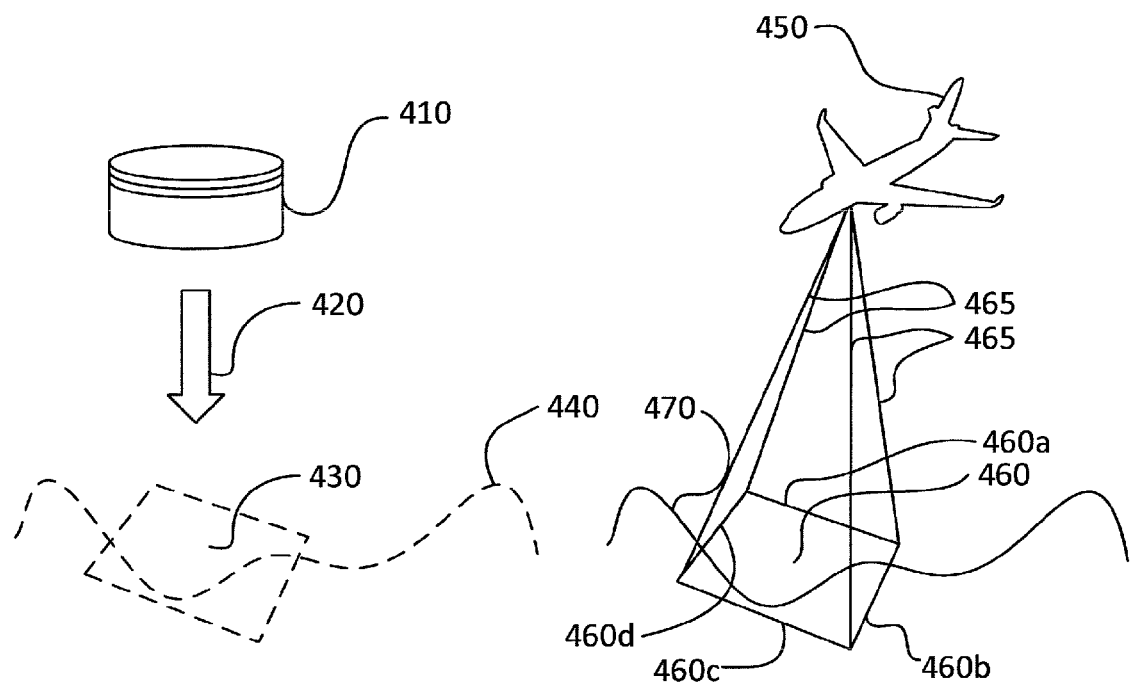
FIG. 4 shows a sketch illustrating one example over how a two-dimensional image is provided from a database according to the present invention.

FIG. 4 shows a sketch illustrating one example over how a two-dimensional image 430 is provided from a database 410 according to the present disclosure. The database 410 comprises three-dimensional geo-referenced information of the environment, for example as described in relation to step 130. In one example, the database 410 is on board of the aerial vehicle 450. This has the advantage that the time for the aerial vehicle 450 to access the database 410 is minimised, which can be important for navigation purposes. Another advantage is that the database 410 is easily available for the aerial vehicle 450 which then needs not to rely on radio communication and/or communication to a satellite. This will make the navigation system of the aerial vehicle 450 less vulnerable. In one example the database 410 is stored on a non-volatile memory on board the aerial vehicle. In another example the database 410 is stored externally, i.e. not on board the aerial vehicle 450. In one example the database 410 is stored on a closed by aerial vehicle. In another example the database 410 is stored on a water-based or land-based facility or vehicle. The database 410 can in principle be placed anywhere as long as there is the possibility for the aerial vehicle 450 to access the database 410. In one example this is achieved via a communication channel.

The aerial vehicle 450 is then arranged to provide sensor images from at least one aerial vehicle sensor (not shown). In FIG. 4 it is for simplicity assumed that only one aerial vehicle sensor is present. It is, however, possible to use several aerial vehicle sensors as described earlier. The aerial vehicle sensor has its field of view which is limited by borders 465 and will then provide a sensor image 460 from the environment 470. The sensor image 460 will show that part of the environment 470 which is limited by the intersections of the field of view borders 465 with the environment 470, i.e. which is limited by the intersection lines 460*a*, 460*b*, 460*c*, 460*d*. This is indicated in FIG. 4. One should, however, observe that these intersection lines 460*a*, 460*b*, 460*c*, 460*d* in general are not straight lines but rather curved due to the three-dimensional shape of the environment. The sensor image itself as seen by the sensor is, however, in general still rectangular as with any standard image. These relations are very well known in the art and thus not described any further here.

Having input data comprising information related to pitch angle, roll angle, yaw angle and three-dimensional position of the aerial vehicle, and thus related to pitch angle, roll angle, yaw angle and three-dimensional position of the aerial vehicle sensor as described above, one can then provide 420 a two-dimensional image 430 from the database based on the input data. Preferably, the two-dimensional image from the database is provided in such a way that it is projected onto the field of view of the aerial vehicle sensor, where it is assumed that the aerial vehicle has its pitch angle, roll angle, yaw angle and three-dimensional position according to the input data.

The image 430 provided from the database will then have the same orientation and intersection lines as the image 460, and the three-dimensional geo-referenced information 440 of the environment which is comprised in the database 410 will relate to the same environment 470 as seen by the sensor. Thus, the image 430 provided from the database 410 will correspond to the sensor image 460 as seen by the aerial vehicle sensor. This means that both images will have the same deformation of objects due to the viewing direction and the three-dimensional shape of the environment 440, 470.

The image 430 from the database 410 will thus be as if it would have been taken by a sensor with the pitch angle, roll angle, yaw angle and three-dimensional position according to the input data. When the image then will be compared in step 140 of FIG. 2, one can determine how well the images correspond to each other, as described in relation to FIG. 2. When the images don't perfectly fit each other this can, among other things, be due to that the angles and/or position of the aerial vehicle where the information relating to it is comprised in the input data is not correct. For example, the real three-dimensional position of the aerial vehicle might be shifted compared to the three-dimensional position of the aerial vehicle which is assumed in the input data. Then, especially a calculated cross-correlation between the images which involves calculating convolution can give an estimate about how big this shifting is, so that the input data can be adapted accordingly when the input data is set 120 the next time in FIG. 2. The new assumption of input data can then be tested in the next run as described earlier.

In one example, one or more uncertainties in the image 430, which originate from uncertainties in the geo-referenced information of the environment as stored in the database 410, are used to determine an uncertainty for the determined at least one quality as described in relation to FIG. 2, especially an uncertainty for the determined three-dimensional position of the aerial vehicle 450.

Figure 5:
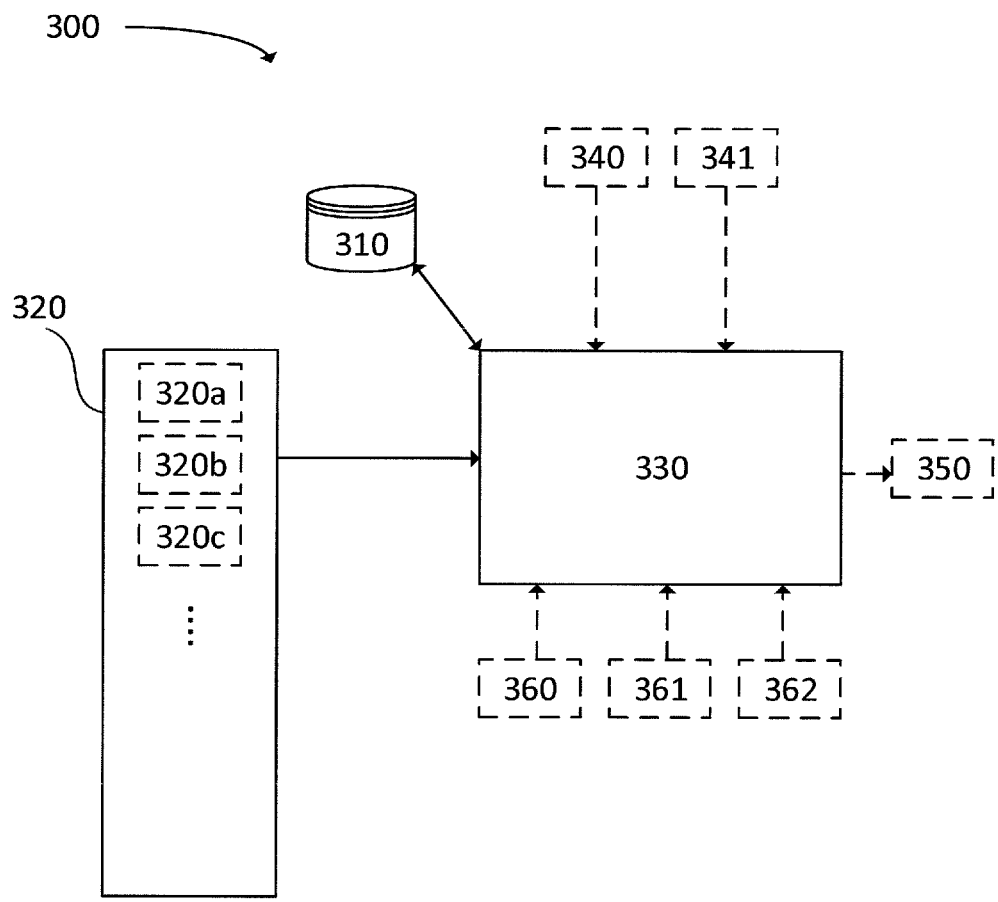
FIG. 5 shows a schematic sketch of system for navigation of an aerial vehicle according to the present invention.

In FIG. 5 a schematic sketch of a system 300 for navigation of an aerial vehicle according to the present invention is shown. The system contains a database 310 which contains three-dimensional geo-referenced information of the environment. The database 310 corresponds in one example to the database 410 described in relation to FIG. 4.

The system 300 further comprises at least one aerial vehicle sensor 320. The at least one aerial vehicle sensor 320 is arranged to provide a sensor image. In one embodiment the at least one sensor 320 comprises several sensors 320*a*, 320*b*, 320*c*. In one embodiment the at least one sensor is arranged to provide several sensor images. In one embodiment the at least one sensor 320 comprises an infrared sensor 320*a*. In one embodiment the at least one sensor 320 comprises a sensor 320*b* which can detect in the visible wavelength-range. In one embodiment the at least one sensor 320 comprises a sensor 320*c* receiving laser and/or radar signals. In one embodiment the at least one sensor 320 comprises a synthetic aperture radar (SAR). In one embodiment the at least one sensor 320 comprises one or more cameras as described in relation with FIG. 2. In one example said one or more camera is at least one of an infrared camera, an ultraviolet camera, a multispectral camera or a hyperspectral camera.

The system 300 further comprises a processing unit 330. The processing unit is arranged to receive the sensor image. In case the at least one sensor provides several sensor images the processing unit is arranged to receive these several sensor images.

The processor unit 330 is further arranged to set input data comprising information related to pitch angle, roll angle, yaw angle and a three-dimensional position of the aerial vehicle. In one embodiment the system 300 comprises a GNSS-receiver 340. The GNSS-receiver 340 is then arranged to send data regarding a position of the aerial vehicle to the processing unit 330. In one embodiment the system 300 comprises an IMU 341. The IMU 341 is then arranged to send data regarding pitch angle, yaw angle, and/or roll angle to the processing unit 330. The processing unit is then arranged to receive the data from the IMU 341 and/or the GNSS-receiver 340 and to use this data for setting initial values for the input data as described earlier. Here, the term GNSS-receiver 340 does also comprise that the information received by the GNSS-receiver is used to determine a three-dimensional position of the aerial vehicle if not in a GNSS-denied area. This can be done either in the GNSS-receiver 340, or at some other element, for example the processing unit 330.

The processing unit 330 is further arranged to provide two-dimensional images from the database based on the input data. It is also arranged to compare the sensor image with a two-dimensional images from the database, to decide which of the two-dimensional images corresponds best to the sensor image, and to determine at least one of the following quantities pitch angle, roll angle, yaw angle and three-dimensional position of the aerial vehicle based on the input data for which the best correspondence was achieved between one of the two-dimensional images and the sensor image. These processes are as well described above, especially in relation to FIG. 2.

The processing unit 330 is even further arranged to communicate said at least one quantity. In one embodiment the at least one quantity is, directly or indirectly, communicated to a pilot of the aerial vehicle. In one embodiment the at least one quantity is, directly or indirectly, communicated to an operator of the aerial vehicle.

In one embodiment the system 300 further comprises a steering unit 350 for the aerial vehicle, the steering unit being arranged to receive the communicated said at least one quantity from the processing unit 330. The steering unit comprises in one embodiment an autopilot.

In a preferred embodiment all parts of the system 300 are on board the aerial vehicle. However, in one embodiment parts of the system might also be at other places. This has been described before.

Some parts of the system might be at different places at the aerial vehicle, while other parts might be close together or even integrated to each other. In one embodiment the processing unit 330 and the steering unit 350 are integrated.

In a preferred embodiment the at least one quality determined by the processing unit 330 is the three-dimensional position of the aerial vehicle.

In one embodiment the processing unit 330 is arranged to repeatedly perform the processes of setting input data, providing a two-dimensional image, and comparing the two-dimensional image with the sensor image until at least one predetermined criterion is reached. Afterwards the at least one quantity is determined. The process of doing this is described in more detail in relation to FIG. 2.

In one embodiment, the processing unit 330 is further arranged to calculate an uncertainty for the determined at least one quantity based on an uncertainty in the three-dimensional geo-referenced information of the environment. The uncertainty for the determined at least one quantity can then be communicated in the same way as the at least one quantity. Having an uncertainty for the at least one quantity allows for the receiver (for example, pilot, operator, steering system, etc.) of the at least one quantity to make decisions of how to operate the aerial vehicle based on this uncertainty. Thus, certain decisions might only be taken if the uncertainty is, for example, below a certain value.

In one embodiment, when the system 300 comprises several aerial vehicle sensors 320a, 320b, 320c . . . , the processing unit 330 is further arranged to perform independently for each sensor image the earlier described processes of receiving sensor images, setting input data, providing two-dimensional images, comparing images, and determining at least one of the following quantities pitch angle, roll angle, yaw angle and three-dimensional position of the aerial vehicle. The processing unit is then even further arranged to determine a combined at least one quantity based on the corresponding determined at least one quantity for each sensor image. This is described in more detail in relation to FIG. 3.

In one embodiment the processing unit 330 is arranged to receive data from further input elements. In one embodiment a further input element is a barometer 360. In one embodiment a further input element is an aerometer 361. In one embodiment a further input element is an input element 362 for receiving inputs from a pilot or an operator of the aerial vehicle. The further input elements are in one embodiment used for receiving information about pressure, air, water, and/or the environment. This information can then be used for further improving the system 300. For example, a sensor image from a land area is in general better for performing the invention than a sensor image from a water area. This is due to the fact that the variations of a land area, both in its geometrical shape and in its texture, in general are more pronounced than variations of a water area. Thus, in one embodiment, when several aerial vehicle sensors 320 are present, the additional input elements can be used to determine which of the sensors are providing sensor images from land areas and which of the sensors are providing sensor images from water areas. The processing unit 330 can then, for example, decide to adapt the reliability of the sensor images accordingly when determining the combined at least one quality. In one embodiment, the further input elements are used to determine whether the at least one sensor 320 is only providing sensor images from water areas or not. The system 300 can then in one embodiment decide not to trust on the determined at least one quantity if all used sensor images only are from water areas. In this case the system 300 might decide to only use other ways of navigation, for example information from an IMU 341, until at least one sensor provides sensor images from a land area again.

In one embodiment, the system 300 is also used to calibrate one or, if applicable, more of the at least one sensor 320. Preferably, the at least one sensor 320 is calibrated before start of the aerial vehicle. If this, however, is not possible or a re-calibration is needed, this can in one embodiment be performed by the system 300 before the aerial vehicle enters a GNSS-denied area. For doing so the initial input data is set in such a way that the information relating to the three-dimensional position of the aerial vehicle corresponds to the three-dimensional position of the aerial vehicle as determined based on a GNSS-receiver 340 (and, if applicable, based on further input elements, such as, for example, a barometer 360). When then the images are compared in step 140 (as described in relation to FIG. 2), a cross-correlation can be determined. The two images should correspond perfectly to each other, up to some uncertainties, since the real position is known due to the GNSS and this is used together with real values for the angles in the input data for providing the two-dimensional image from the database 310. Thus, apart from uncertainties, any discrepancies should originate from non-calibrated sensors, especially cameras. The information about the discrepancies can then be used for calibrating the sensors. The way of calibrating a sensor based on discrepancies between a sensor image and a "real" image (which here is considered to be the image provided from the database) is known in the art and such not described here any further.

The invention claimed is:

1. A method for navigation of an aerial vehicle, the method comprising the steps of:
   providing a sensor image from an aerial vehicle sensor;
   repeatedly, until at least one predetermined criterion is reached, performing the following:

(i) setting input data comprising information related to pitch angle, roll angle, yaw angle and three-dimensional position of the aerial vehicle;
(ii) providing a two-dimensional image from a database based on the input data, where the database comprises three-dimensional geo-referenced information of the environment; and
(iii) comparing the sensor image and the two dimensional image from the database; and
using the input data for which the two images correspond best to each other for determining at least one of the following quantities, including pitch angle, roll angle, yaw angle and three-dimensional position of the aerial vehicle.

2. The method according to claim 1, wherein the determined at least one quantity comprises the three-dimensional position of the aerial vehicle.

3. The method according to claim 1, wherein the step of comparing the sensor image and the two dimensional image from the database comprises calculating a similarity measure between the two images.

4. The method according to claim 3, wherein the two images which correspond best to each other are the two images which have the highest calculated similarity measure between the two images.

5. The method according to claim 3, wherein calculating a similarity measure between the two images comprises calculating a cross-correlation between the two images, preferably a normalised cross-correlation.

6. The method according to claim 5, wherein the normalised cross-correlation is calculated and the value of the normalised cross-correlation for the two images which correspond best to each other is used for calculating an uncertainty of the least one quantity.

7. The method according to claim 3, wherein the step of providing a two-dimensional image from a database based on the input data comprises providing the two-dimensional image from the database in such a way that it is projected onto the field of view of the aerial vehicle sensor, where it is assumed that the aerial vehicle has its pitch angle, roll angle, yaw angle and three-dimensional position according to the input data.

8. The method according to claim 1, wherein the setting of the input data is updated in each step in such a way as to find the best correspondence between the two images.

9. The method according to claim 1, wherein the predetermined criterion is at least one of: that the steps are repeated a predetermined number of times or that the best correspondence between the two images which has been achieved converges.

10. The method according to claim 1, wherein an uncertainty in the three-dimensional geo-referenced information of the environment is used to calculate an uncertainty of the at least one quantity.

11. The method according to claim 1, wherein sensor images from different aerial vehicle sensors are provided and the method is performed independently for the sensor image of each such aerial vehicle sensor, whereupon the determined at least one quantity is a combination of the determined at least one quantity for each independently performed method.

12. The method according to claim 11, wherein the combination of the determined at least one quantity for each independently performed method is based on at least one of the reliability or the accuracy of the sensors from which the sensor images are provided.

13. A method according to claim 1, wherein an initial setting of the input data comprises information related to assumed real values for the aerial vehicle, especially information related to assumed real values for the pitch angle, the roll angle, the yaw angle and the three-dimensional position of the aerial vehicle.

14. A method according to claim 1, wherein:
the input data comprises pitch angle, roll angle, yaw angle and three-dimensional position of the aerial vehicle; and
the determined at least one quantity is the corresponding at least one quantity of the input data for which the two images correspond best to each other.

15. A system for navigation of an aerial vehicle, the system comprising:
a database containing three-dimensional geo-referenced information of the environment; and
at least one aerial vehicle sensor providing a sensor image;
a processing unit configured to:
receive the sensor image;
set input data comprising information related to pitch angle, roll angle, yaw angle and a three-dimensional position of the aerial vehicle;
provide two-dimensional images from the database based on the input data;
compare the sensor image with a two-dimensional images from the database;
identify which of the two-dimensional images corresponds best to the sensor image;
determine at least one of the following quantities, including pitch angle, roll angle, yaw angle and three-dimensional position of the aerial vehicle based on the input data for which the best correspondence was achieved between one of the two-dimensional images and the sensor image; and
communicate said at least one quantity.

16. The system according to claim 15, further comprising a steering unit for the aerial vehicle, the steering unit being configured to receive the communicated said at least one quantity.

17. The system according to claim 15, where the determined at least one quantity comprises the three-dimensional position of the aerial vehicle.

18. The system according to claim 15, where the processing unit is further configured to repeatedly perform the processes of setting input data, providing a two-dimensional image, and comparing the two-dimensional image with the sensor image until at least one predetermined criterion is reached.

19. The system according to claim 15, further comprising:
several aerial vehicle sensors, each providing a sensor image; and
wherein:
the processing unit is further configured to perform independently for each sensor image said processes of receiving sensor images, setting input data, providing two-dimensional images, comparing images, and determining at least one of the following quantities pitch angle, roll angle, yaw angle and three-dimensional position of the aerial vehicle; and
the processing unit further is further configured to determine a combined at least one quantity based on the corresponding determined at least one quantity for each sensor image.

20. The system according to claim 15, where the processing unit is further configured to calculate an uncertainty for the determined at least one quantity based on an uncertainty in the three-dimensional geo-referenced information of the environment.

21. A computer program product comprising at least one non-transitory computer-readable storage medium having a program code for navigation of an aerial vehicle stored therein, the program code portions comprising at least one executable portion configured for:
    providing a sensor image from an aerial vehicle sensor;
    repeatedly, until at least one predetermined criterion is reached, performing the steps:
        (i) setting input data comprising information related to pitch angle, roll angle, yaw angle and three-dimensional position of the aerial vehicle;
        (ii) providing a two-dimensional image from a database based on the input data, where the database comprises three-dimensional geo-referenced information of the environment; and
        (iii) comparing the sensor image and the two dimensional image from the database; and
    using the input data for which the two images correspond best to each other for determining at least one of the following quantities, including pitch angle, roll angle, yaw angle and three-dimensional position of the aerial vehicle.

* * * * *